United States Patent [11] 3,627,827

| [72] | Inventor | John A. Scheben<br>Erlanger, Ky. |
| --- | --- | --- |
| [21] | Appl. No. | 775,961 |
| [22] | Filed | Nov. 14, 1968 |
| [45] | Patented | Dec. 14, 1971 |
| [73] | Assignee | National Distillers and Chemical Corporation<br>New York, N.Y.<br>Continuation-in-part of application Ser. No. 496,686, Oct. 15, 1965, now abandoned. This application Nov. 14, 1968, Ser. No. 775,961 |

[54] REACTION OF ALLYLIC HALIDES WITH CARBON MONOXIDE AND ACETYLENE
9 Claims, No Drawings

[52] U.S. Cl. ................................................ 260/544 A, 260/408, 260/468 CB, 260/469, 260/476, 260/486 AC, 260/488 R

[51] Int. Cl. ........................................ C07c 51/14
[50] Field of Search ........................... 260/544 A, 408, 486, 468 B, 469, 476, 486 AC

[56] References Cited
UNITED STATES PATENTS
3,338,961  8/1967  Closson .................. 260/544

*Primary Examiner*—Lewis Gotts
*Assistant Examiner*—Edward Jay Gleiman
*Attorney*—Allen A. Meyer, Jr.

ABSTRACT: A process is provided for preparing 2,5-dienoyl halides, which comprises reacting a β,γ-unsaturated alkylene halide with carbon monoxide and acetylene at a temperature within the range from about 20° to about 250° C. at which reaction proceeds, below the decomposition temperature of the reactants and reaction products, under a pressure within the range from about 1 to about 300 atmospheres in the presence of a platinum-palladium triad catalyst.

REACTION OF ALLYLIC HALIDES WITH CARBON MONOXIDE AND ACETYLENE

This application is a continuation-in-part of Ser. No. 496,686, filed Oct. 15, 1965 and now abandoned.

This invention relates to a process for preparing 2,5-dienoyl halides by reacting allylic halides with carbon monoxide and acetylene in the presence of a platinum or palladium triad catalyst, and more particularly to a process for reacting allylic halides with carbon monoxide and acetylene in the presence of palladous chloride to produce 2,5-hexadienoyl halides and in good yield.

Chiusoli, Gazz. chim. ital., 89, 1332–1337 (1959), U.S. Pat. No. 3,146,256, dated Aug. 25, 1964, has described the synthesis of mono-unsaturated carboxylic acids and esters from allyl chloro derivatives and carbon monoxide or from acetylene and carbon monoxide in the presence of nickel carbonyl as a catalyst. Using allyl chloride as exemplary, the reaction proceeds as follows:

$$CH_2=CHCH_2Cl + Ni(CO)_4 \longrightarrow$$

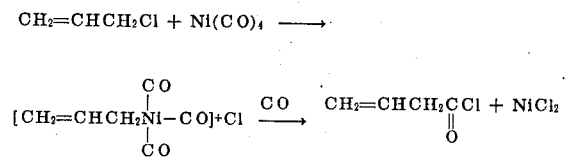

As the above reaction shows, the nickel carbonyl takes part in the reaction, forming an intermediate nickel carbonyl complex with the allylic halide, which can then be decomposed by the action of carbon monoxide to form the corresponding acyl halide plus nickel chloride. The nickel chloride can be returned to nickel carbonyl by hydrolysis and reaction with carbon monoxide, and sometimes this takes place in the reaction mixture, but this reverse reaction is not easy to control in a manner to obtain a quantitative yield of the carbonyl. Consequently, as Chiusoli points out, a considerable proportion of nickel carbonyl is changed to nickel chloride, and due to this and the fact that only 40 percent yields are obtainable, this reaction is not practical from the commercial standpoint as a method for the preparation of acyl halides from allyl chloride. The reaction is, however, of considerable theoretical interest, and it can be carried out not only with carbon monoxide but also with acetylene, which enters into the molecule in the same relative position as the carbonyl group.

When Chiusoli reacts allyl chloro-derivatives, carbon monoxide, acetylene, and water or alcohol in the presence of nickel carbonyl, there are formed unsaturated acids or esters according to the following equations:

$$CH_2=CHCH_2Cl + Ni(CO)_4 + CO + C_2H_2 + ROH \rightarrow$$
$$CH_2=CHCH_2CH=CHCOOR + HCl + NiCl_2$$

Nickel carbonyl is partially replaced in this reaction, but the amount of nickel carbonyl added initially is fairly large, on a molar basis about one-half of the amount of the allylic halide charged.

In accordance with the instant invention, 2,5-dienoyl halides are prepared from β,γ-unsaturated alkylene halides by reaction with carbon monoxide and acetylene in the presence of a platinum-palladium triad catalyst. The reaction proceeds under moderate conditions in accordance with the following scheme, using acetylene and palladous chloride as illustrative:

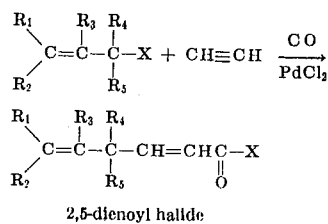

2,5-dienoyl halide

The reaction is applicable, as the above reaction scheme indicates, to any allylic or β,γ-unsaturated aliphatic halide having the formula set out in the first equation.

In this formula, $R_1$, $R_2$, $R_3$, $R_4$, and $R_5$ can be hydrogen or an organic hydrocarbon radical having from one to about 30 carbon atoms, such as alkyl groups having from one to about nine carbon atoms; aryl groups having from six to about 30 carbon atoms, including aralkyl and alkaryl groups in which each alkyl or alkylene substituent may have up to 15 carbon atoms, and having from one to five such substituents per aryl nucleus; cycloalkyl groups having from six to about 30 carbon atoms, including alkyl-substituted cycloalkyl groups in which each alkyl substituent has up to about 15 carbon atoms, halogen-substituted alkyl and cycloalkyl groups, the halogen including chlorine, bromine, fluorine, and iodine.

X is halogen, including chlorine, bromine, fluorine, and iodine.

The reaction proceeds in the presence of any platinum or palladium triad catalyst, generically referred to in the claims as a "platinum-palladium triad catalyst," including, for example, platinum, palladium, osmium, iridium, rhodium, and ruthenium. Compounds of these metals can, for instance, be the salts, for example, the chloride, bromide, nitrate, sulfate, or acetate; the oxides; and organic complexes of the metal, such as for instance, the benzonitrile, bis-π-allyl, or acetylacetonate complexes. The metal or the compound of the metal can be supported on an inert carrier such as carbon, alumina, or silica. The palladium halides are particularly desirable because they are available and give excellent yield, and accordingly these are preferred, for instance, palladous chloride and palladous bromide.

Other exemplary catalysts are palladium on carbon; palladous oxide; palladous benzoate; bis(benzonitrile)palladous chloride; the chlorides of rhodium, ruthenium, platinum, iridium, and osmium; platinous acetate; rhodium oxide; palladous cyanide; potassium chloropalladite; and palladous acetylacetonate.

Compounds known to complex with the platinum or palladium triad group metals can also be added as cocatalysts. Examples of such ligands include triphenylphosphine, pyridine, benzonitrile, and pentane-1,3-dione. Small amounts of such cocatalysts suffice to give an improved effect. Amounts within the range from about 10 to about 500 mole percent based on the amount of the catalyst can be used.

Exemplary β,γ-unsaturated aliphatic halides include allyl chloride, allyl bromide, β-methallyl chloride, β-methallyl bromide, γ-methallyl Chloride, γ-methallyl bromide, 1-phenyl-3-chloropropene-1, 1-chloromethylcyclohexene, ethyl-2-chlorobutene3,p-nitrocinnamylbromide, and bisallylic halides, such as 1,4-dichloro-2-butene.

The amount of catalyst is in no way critical, and very small amounts give effective results. Amounts within the range from about 0.001 to 20 molar percent based on the amount of the allylic halide can be used. Amounts within the range from about 0.001 to 5 molar percent are preferred. Two or more platinum-palladium triad catalysts can be used in admixture, for advantageous effects.

The carbon monoxide is conveniently introduced in gaseous form. The reaction mixture containing the allylic halide is preferably in the liquid phase. In this event, the carbon monoxide can be bubbled into the reaction mixture, or, alternatively, if the carbon monoxide is used as an atmosphere, intermixed therewith by vigorous stirring of the reaction mixture. If the reaction is carried out under pressure in a bomb, rotation of the bomb will provide adequate mixing.

The pressure of carbon monoxide is not critical; however, inasmuch as the carbon monoxide reacts mole for mole with the β,γ-unsaturated aliphatic halide, it will of course be used in an amount of at least 1 mole per mole of the halide. The pressure of carbon monoxide can range from about 1 to about 300 atmospheres. The preferred pressure is within the range from about 35 to about 90 atmospheres.

The reaction proceeds at moderate temperatures, ranging from room temperature up to about 250° C. The upper limit of reaction temperature is not critical and will be determined by the decomposition temperature of the reactants and reaction products. At temperatures below 20° C., the reaction rate may be slow, but such temperatures can also be used. An optimum reaction rate is obtained within the range from about 35° to about 110° C.

An inert organic solvent can be used as a diluent and to provide the liquid phase in the case where the β,γ-unsaturated aliphatic halide is a gas or a solid. The reaction medium is preferably anhydrous, and, accordingly, anhydrous solvents should be used. Satisfactory solvents include the aliphatic and aromatic hydrocarbons, such as hexane, octane, decane dodecane, petroleum ethers, benzene, toluene, xylene, and mesitylene; the chlorinated aliphatic hydrocarbons, such as ethyl chloride, butyl chloride, and 1,2-dichloroethane; ethers such as ethyl ether and dimethoxyethane; and phosphines such as tributyl phosphine.

The pressure of the acetylene is not critical. In order to ensure preferential addition of the acetylene to the allylic halide, the pressure of acetylene should be such as to provide a molar ratio of acetylene to allylic halide of which is, most preferably, within the range from about 0.25 to about 4 parts of the acetylene per part of the allylic halide. Accordingly, the pressure of acetylene can range from 1 to 50 atmospheres or more.

At the conclusion of the reaction, the product is recovered by separating the catalyst by filtration or by centrifugal separation. Any inert solvent and unreacted β,γ-unsaturated aliphatic halide is removed by distillation, and the residue, which is the higher boiling 2,5-hexadienoyl halide, is recovered.

The process is particularly adapted for continuous operation, in which case the catalyst, β, ,γ-unsaturated aliphatic halide, any solvent, and the acetylene are blended and cycled to a reactor where they are combined with carbon monoxide, held in the reactor for the required time, and then separated as before. The reactor can, if desired, be in elongated form with the traverse time equal to the reaction time. Any unreacted β,γ-unsaturated aliphatic halide can be recycled to the starting material.

The process of the invention can be used to prepare 2,5-hexadienoyl halides that are very difficult to prepare by other methods. These dienoyl halides are useful in the normal manner of acyl halides in that they undergo hydrolysis to form the corresponding dienoic acids and undergo esterification with alcohols to form the corresponding dienoic esters. These can be hydrogenated, if desired, to the saturated acid chlorides, acids, and esters. Furthermore, the unsaturated groups make it possible for them to undergo epoxidation reactions, so that they can form diepoxy esters or unsaturated monoepoxy esters and acids. They can also be polymerized by themselves or with other reactive monomers to form complex polymers of varying types and are useful cross-linking agents for linear polymers.

The following examples, in the opinion of the inventor, represent preferred embodiments of his invention.

EXAMPLE 1

Allyl chloride (1 mole) and a few millimoles of palladous chloride are placed in the glass liner of a rocking autoclave. The autoclave is purged with nitrogen, and then pressured with acetylene to approximately 15 atmospheres. Carbon monoxide is then added to a pressure of 50 atmospheres. The reactor contents are rocked and heated at 80° C. for 3 days. The excess pressure was then vented, and the bomb contents filtered to separate the catalyst. The produce is 2,5-hexadienoyl chloride.

EXAMPLE 2

A reaction is carried out as in example 1, but using platinous chloride. The reaction is carried out at 70° C. for 3 days under an initial acetylene pressure of 13 atmospheres and carbon monoxide pressure of 85 atmospheres. The product is 2,5-hexadienoyl chloride.

EXAMPLE 3

To a small tube reactor was added 0.181 gram of bis-(benzonitrile) palladous chloride complex (0.47 millimole) and 5 ml. of allyl chloride (61 millimoles). The reactor contents were purged with nitrogen, cooled in an ice bath, and saturated with acetylene to a pressure of 13.6 atmospheres. Carbon monoxide was then admitted to a pressure of 34 atmospheres. The reactor was heated and tumbled at 60° C. for 52 hours.

At the end of this time, the reactor was cooled in an ice bath and vented. The product was 2,5-hexadienoyl chloride.

The contents of the reactor were esterified with methanol at 0° C. The unsaturated esters were hydrogenated at ambient temperature, using a 5 percent palladium carbon catalyst. Analysis of the hydrogenated esters showed the presence of methyl hexanoate.

EXAMPLE 4

γ-Methallyl chloride (1 mole) and a few millimoles of palladous bromide were placed in the glass liner of a rocking autoclave. The autoclave is then saturated with acetylene to a pressure of 20 atmospheres. Carbon monoxide is added, to a pressure of 34 atmospheres. The reactor contents are rocked and heated at 65° C. for 4 days. The excess pressure is then vented, and the bomb contents filtered to separate the catalyst. The product is 2,5-heptadienol chloride.

EXAMPLE 5

A reaction is carried out as in example 4, but using phenallyl chloride. The reaction is carried out at 74° C. for 4 days under an initial acetylene pressure of 15 atmospheres and carbon monoxide pressure of 85 atmospheres. The produce is phenyl-2,5-hexadienoyl chloride.

EXAMPLE 6

To a small tube reactor is added less than 1 gram of platinous chloride and a few ml. of allyl chloride. The reactor contents are purged with nitrogen, cooled in an ice bath, and saturated with acetylene to a pressure of 17 atmospheres. Carbon monoxide is then admitted to a pressure of 40 atmospheres. The reactor is heated and tumbled at 75° C. for 3 days.

At the end of this time, the reactor is cooled in an ice bath, and vented. The product is 2,5-hexadienoyl chloride.

EXAMPLE 7

A few millimoles of platinous chloride and 1-chlormethyl-cyclohexene (1 mole) are placed in the glass liner of a rocking autoclave. The autoclave is purged with nitrogen. Acetylene is added to a pressure of 15 atmospheres and carbon monoxide is then added to a pressure of 30 atmospheres. The reactor contents are rocked and heated at 90° C. for 4 days. The excess pressure is then vented, and the bomb contents filtered to separate the catalyst. The product is 4-cyclohexene-2-butenoyl chloride.

EXAMPLE 8

A reaction was carried out as in example 7, but using β-methallyl bromide. The reaction is carried out at 74° C. for 3 days under an initial acetylene pressure of 15 atmospheres and a carbon monoxide pressure of 85 atmospheres. The product is 5-methyl-2,5-hexadienoyl chloride.

EXAMPLE 9

To a small tube reactor was added a few tenths of a gram of palladium metal and a few ml. of allyl chloride. The reactor contents are purged with nitrogen, cooled in an ice bath, and saturated with acetylene to a pressure of 15 atmospheres. Carbon monoxide is then admitted to a pressure of 50 atmospheres. The reactor is heated and tumbled at 70° C. for 3 days.

At the end of this time, the reactor is cooled in an ice bath and vented. The produce is 2,5-hexadienoyl chloride.

EXAMPLE 10

Palladous chloride (a few millimoles) and 1,4-dichloro-2-butene (1 mole) are placed in the glass liner of a rocking autoclave. The autoclave is purged with nitrogen, and acetylene added to a pressure 22 atmospheres, and carbon monoxide added to a pressure of 40 atmospheres. The reactor contents are rocked and heated at 80° C. for 3 days. The excess pressure is then vented, and the bomb contents filtered to separate the catalyst. The product is 2,5,8-decatriene-1,8-di-oyl Chloride.

EXAMPLE 11

A reaction was carried out as in example 10, but using γ-methallyl bromide. The reaction is carried out at 74° C. for 3 days under an initial acetylene pressure of 15 atmospheres and a carbon monoxide pressure of 55 atmospheres. The produce is 2,5-heptadienoyl chloride.

EXAMPLE 12

To a small tube reactor is added a few tenths of a gram of ruthenium trichloride and a few ml. of allyl chloride. The reactor contents are purged with nitrogen, cooled in an ice bath, and saturated with acetylene to a pressure of 17.5 atmospheres. Carbon monoxide is then admitted to a pressure of 40 atmospheres. The reactor is heated and tumbled at 70° C. for 3 days.

At the end of this time, the reactor is cooled in an ice bath and vented. The product is 2,5-hexadienoyl chloride.

Having regard to the foregoing disclosure, the following is claimed as the inventive and patentable embodiments thereof:

1. A process for preparing 2,5-dienoyl halides, which comprises reacting a β,γ-unsaturated alkylene halide with carbon monoxide and about 25–400 molar percent based on the amount of the halide of acetylene at a temperature within the range from about 20° to about 250° C. at which reaction proceeds, below the decomposition temperature of the reactants and reactions products, under a pressure within the range from about 1 to about 300 atmospheres in the presence of about 0.001–200 molar percent based on the amount of the halide of a platinum, palladium, ruthenium, rhodium, osmium or iridium catalyst to form the dienoyl halide, and recovering the dienoyl halide thus formed.

2. A process in accordance with claim 1, in which the catalyst is a palladium catalyst.

3. A process in accordance with claim 1, in which the β,γ-unsaturated halide is allyl chloride.

4. A process in accordance with claim 1, in which the β,γ-unsaturated halide is methallyl chloride.

5. A process in accordance with claim 1 in which the reaction is carried out at a temperature within the range from about 35° to about 110° C. and a pressure within the range of 35 to 90 atmospheres.

6. A process for preparing 2,5-dienoyl halides, which comprises reacting a β,γ-unsaturated alkylene halide having the formula:

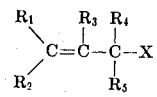

in which $R_1$, $R_2$, $R_3$, $R_4$ and $R_5$ are selected from the group consisting of
hydrogen,
an alkyl group having from one to nine carbon atoms,
an aryl group having from six to 30 carbon atoms,
an aralkyl group wherein the alkyl group has one to 15 carbon atoms,
an alkaryl group wherein the alkylene group has one to 15 carbon atoms and wherein there are from one to five of such substituents per aryl nucleus,
a cycloalkyl group having from six to 30 carbon atoms,
an alkyl substituted cycloalkyl group with from six to 30 carbon atoms in the cycloalkyl group and in which each alkyl substituent has one to about 15 carbon atoms,
a halogen-substituted alkyl or cycloalkyl group in which said halogen is selected from the group consisting of chlorine, bromine, fluorine and iodine, and
an ester-substituted alkyl, aryl or cycloalkyl group, the ester substituent having the form COOR, wherein R can be any of the moieties defined above for $R_1$, $R_2$, $R_3$, $R_4$ and $R_5$, hydrogen excepted;
and X is halogen,
the range from about 20 to about 250° C. at which reaction proceeds, below the decomposition temperature of the reactants and reaction products, under a pressure within the range from about 1 to about 300 atmospheres in the presence of about 0.001–5 molar percent based on the amount of the halide of a platinum, palladium, ruthenium, rhodium, osmium or iridium catalyst to form the dienoyl halide.

7. A process in accordance with claim 6, wherein the catalyst is selected from the group consisting of metals of the groups consisting of platinum, palladium, osmium, iridium, rhodium and ruthenium; the chlorides, bromides, nitrates, sulfates, acetates and oxides of said metals; the organic complexes of said metals with members of the groups consisting of benzonitrile, bis-πallyl and acetylacetonate; palladous benzoate, bis(benzonitrile) palladous chloride, palladous cyanide, rubidium carbonate, and potassium chloropalladite.

8. A process for preparing a 2,5 hexadienoyl chloride, which comprises reacting an allyl chloride selected from the group consisting of allyl chloride, β-methallyl chloride and phenallyl chloride with carbon monoxide and about 25–400 molar percent based on the amount of the halide of acetylene at a temperature within the range from about 35° to about 110° C. at which reactions proceeds, under a pressure within the range from about 35 to about 90 atmospheres in the presence of about 0.001–5 molar percent based on the amount of the halide of a platinum-palladium triad catalyst selected from the group consisting of palladous chloride, platinous chloride, bis(benzonitrile) palladous chloride complex, palladous bromide, palladium metal and ruthenium trichloride, to form the 2,5 chloride.

9. A process in accordance with claim 8, wherein the reactants are allyl chloride, acetylene and carbon monoxide, and the catalyst is palladous chloride.

* * * * *